US006303198B1

(12) United States Patent
Chen

(10) Patent No.: US 6,303,198 B1
(45) Date of Patent: Oct. 16, 2001

(54) HOLLOW FORM SURFACE PATTERN STRUCTURE

(76) Inventor: Shou-Te Chen, No. 1, Alley 11-1, Lane 123, Chang-I 6 Street, Tai-Ping Hsiang, Taichung Hsien (TW)

(*) Notice: Subject to any disclaimer, the term of this patent is extended or adjusted under 35 U.S.C. 154(b) by 0 days.

(21) Appl. No.: 09/394,911

(22) Filed: Sep. 13, 1999

(51) Int. Cl.[7] ................................ B44C 1/26; B32B 3/02

(52) U.S. Cl. ......................... 428/34.1; 264/237; 264/537; 428/143; 428/157; 428/195; 428/207; 428/213; 425/143; 425/437; 425/534; 36/28; 36/29

(58) Field of Search ............................. 428/67, 157–213, 428/188, 35.7, 167; 40/616; 264/37, 535, 508; 425/73, 534; 36/3

(56) References Cited

U.S. PATENT DOCUMENTS

| | | | | |
|---|---|---|---|---|
| 4,339,489 | * | 7/1982 | Barker et al. | 428/167 |
| 4,610,099 | * | 9/1986 | Signori | 36/3 |
| 5,525,289 | * | 6/1996 | Lupke et al. | 264/508 |
| 5,536,545 | * | 7/1996 | Codon et al. | 428/40 |
| 5,686,170 | * | 11/1997 | Codon et al. | 428/207 |
| 5,702,652 | * | 12/1997 | Ricciardi et al. | 264/37 |
| 5,702,734 | * | 12/1997 | Hartman et al. | 425/534 |
| 5,858,414 | * | 1/1999 | Hayashi et al. | 425/73 |
| 5,989,675 | * | 11/1999 | Shou-Te Chen | 428/67 |
| 6,139,789 | * | 10/2000 | Meter et al. | 264/535 |

* cited by examiner

*Primary Examiner*—Harold Pyon
*Assistant Examiner*—Shalie Manlove
(74) *Attorney, Agent, or Firm*—Bacon & Thomas, PLLC

(57) ABSTRACT

A hollow form body having a first-level faceplate and a second-level faceplate, with an appropriately sized space formed in between the two faceplates and a pattern formed on the one of the faceplates. An arresting edge of an appropriate height extends from the outline of a pattern such that a recessed area is formed in the bottom section of the pattern by the arresting edge. The pattern is figured on the first-level faceplate. A thick section at the lower extent of the arresting edge of the pattern covers and fastens onto the first-level faceplate, with a section being exposed on the surface of the first-level faceplate. The first-level faceplate fits into the recessed area of the pattern unit itself formed by the arresting edge and a rib is formed where the first-level faceplate covers the arresting edge.

5 Claims, 1 Drawing Sheet

HOLLOW FORM SURFACE PATTERN STRUCTURE

BACKGROUND OF THE INVENTION

1) Field of the Invention

The invention herein relates to a hollow form surface pattern structure that utilizes an arresting edge disposed around the recess of a pattern body that provides for the covering of the arresting edge by the faceplate material during the forming process, and a rib is formed to support and strengthen the faceplate to enable a higher strength faceplate of the hollow form surface on which the pattern is situated.

2) Description of the Prior Art

There are numerous types of conventional hollow form structures. These include tool boxes, tool mounting boards, and brief cases. Such hollow form structures are generally characterized as having a pair of surfaces with air in between them. Among the uses and functions of such paired surfaces, an attractive pattern is usually applied to the first-level faceplate situated at the outer section, with the patterns sometimes being alphanumeric characters, trademarks, or graphic designs, while the second-level faceplate situated in the inner section often has a recess of a certain contour that serves as an insertion space in the shape of tools, for example. Since the fabrication of such hollow forms frequently involves the utilization of a mold having a mold cavity that is the same shape as the exterior of object to be formed, and after the molten plastic tube material is suctioned into the said mold cavity, the plastic tube expands, clings to the mold cavity, and becomes shaped, therefore, the relief pattern on the first-level faceplate and the second-level faceplate must be of the same color, otherwise forming would not be possible and as such, the overall results lack interesting color characteristics; furthermore, since the pattern of the mold cavity and the hollow body as well the pattern details are formed during fabrication, the said hollow form can only be embellished with said pattern because another pattern cannot be figured on the same hollow form, which would require the fabrication of another mold and as such increase production costs.

The inventor the invention herein is the author of U.S. patent application Ser. No. 08/992,272 and the said application provides a hollow form with the pattern disposed on the faceplate and along the outline of the said pattern was a slanted side inclined at an appropriate angle towards the middle surface region in the bottom section of the pattern, with the slanted outline of the pattern mounted by being squeezed over the hollow form faceplate utilizing a technique wherein only the surface of the pattern was exposed. The said technique enabled the pattern reliefed on the hollow form first-level faceplate to be a color different from that of the first-level faceplate, while also allowing for a range of different pattern changes on the same hollow form component without having to fabricate new molds; however, due to the large difference in pattern dimensions and, furthermore, the capability of fashioning numerous pattern on the same faceplate, the patterns occupied a relatively large area on the faceplate and thereby reduced the strength of the said faceplate.

SUMMARY OF THE INVENTION

The objective of the invention herein is to provide a hollow form surface pattern structure comprised of a first-level faceplate and a second-level faceplate, with an appropriately sized space formed in between the said two faceplates and a pattern formed on the one of the said faceplates; an arresting edge of an appropriate height extending along the outline of a pattern such that a recessed area is formed in the bottom section of the pattern by the arresting edge; a pattern figured on the first-level faceplate; a thick section at the lower extent of the arresting edge of the pattern that covers and fastens onto the first-level faceplate, with a section exposed on the surface of the first-level faceplate; the first-level faceplate fits into the recessed area of the pattern unit itself formed by the arresting edge; and a rib is formed where the first-level faceplate covers the arresting edges.

Other features and advantages of the present invention will become apparent in the detailed description of the preferred embodiments following the brief description of drawings listed below.

DETAILED DESCRIPTION OF THE PREFERRED EMBODIMENTS

Figure 1:
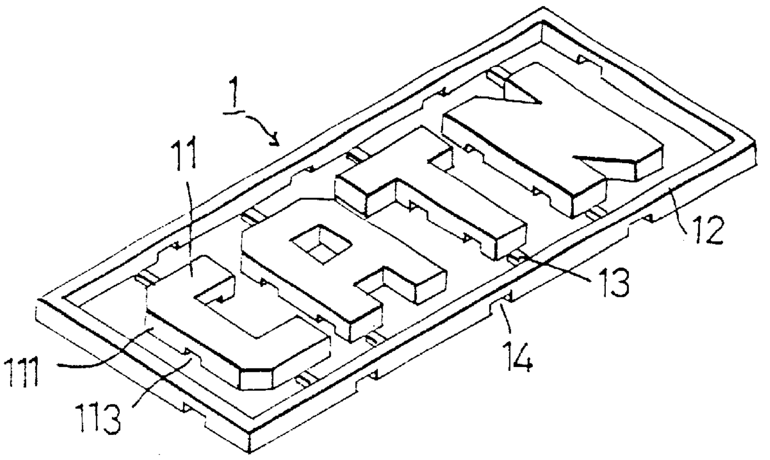
FIG. 1 is an isometric drawing of the preferred embodiment of the pattern structure invention herein.

Referring to FIG. 1, a commercial trademark composed of several alphabetic characters based on the preferred embodiment of the invention herein, the pattern 1 is comprised of a number of alphabetic character pattern units 11, with an appropriate interval of separation between each two pattern units 11 and, furthermore, a rectangular frame 12 surrounds the area in which the pattern units 11 are congregated and a rib 13 is formed in each pattern unit 11 to allow attachment to the frame 12, with the attachment point of the rib 13 to the frame 12 situated at the lowermost edges of the pattern unit 11; and air escape slots 14 are formed at appropriate intervals apart along the lower extent of the frame 12.

Figure 2:
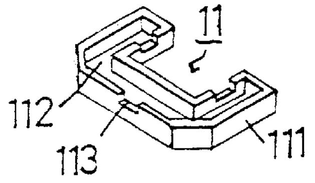
FIG. 2 is an isometric drawing of the preferred embodiment of the rear surface structure of the pattern unit of the invention herein.

Referring to FIG. 2, an arresting edge 111 of an appropriate height extends from the outline of each of the said pattern unit 11 such that a recessed area 112 is formed in the bottom section of the pattern unit 11 by the arresting edge 111 and indented air escape slots 113 are formed at appropriate intervals apart along the bottom edge of the arresting edge 111; the outer sides of the arresting edge 111 are disposed at an appropriate angle, with the slant oriented towards the middle surface region in the bottom section of the pattern unit 11, but the degree of inclination is slight and normally a similar to a mold release angle; and such a angle is also present in the frame 12 area.

Figure 3:
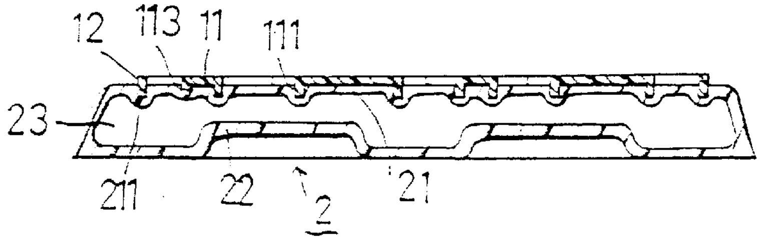
FIG. 3 is a cross-sectional drawing of the preferred embodiment of the structure of the invention herein.

Referring to FIG. 3, during forming, the fabrication of a typical hollow form body 2 involves the molding of a first-level faceplate 21 and a second-level faceplate 22 such that an appropriately sized space 23 remains in between them, with the pattern 1 formed on the first-level faceplate 21, wherein, a thick section at the lower extent of the frame 12 of the pattern 1 covers and fastens onto the firstlevel faceplate 21, and a section is exposed on the surface of the first-level faceplate 21; and a thick section at the lower extent of the arresting edge 111 of the pattern unit 11 covers and fastens onto the first-level faceplate 21.

There is an interval of separation area between the frame 12 and each pattern unit 11 that is determined by the mold, with an even juxtaposed surface maintained between each said area and the first-level faceplate 21, and the firstlevel faceplate 21 fitting into the recessed area 112 of the pattern unit 11 itself formed by the arresting edge 111.

During forming, since the frame 12 and the arresting edges 111 of the pattern units 11 are squeezed over the first-level faceplate 21, undispersed air is forced into the said air escape slot 14 and air escape slot 113, and after forming is completed, the air in the said area is gradually expelled, causing the said air escape slot 14 and air escape slot 113 of the first-level faceplate 21 to sink inward, but in design, the thick section of the frame 12 and the gripping edge 111 cover the said air escape slot 14 and air escape slot 113 such that the said air escape slot 14 and air escape slot 113 are not exposed at the visible outer surface area of the first-level faceplate 21.

In the design of the preferred embodiments of the invention herein, the frame 12 and the arresting edges 111 of the pattern units 11 are covered by the first-level faceplate 21, thereby forming a rib 211 that increases the structural strength of the first-level faceplate 21 which in turn better strengthens the overall resistance against external force of the pattern 1 as supported by the first-level faceplate 1, which advantageously benefits the enhancement of the attractiveness and durability of the hollow formed surface; the design of the air escape slot 14 and the air escape slot 113 enables the efficient release of air during the forming process and increases post-fabrication product quality consistency and surface integrity; furthermore, since the design provided by the preferred embodiments of the invention herein is not only simple in structure, but also allows the hollow forming of virtually any superficial contour, including alphanumeric characters, graphic designs, trademarks, and other patterns, with the said hollow form surfaces capable of being finished in a range of different coloration such that when similar hollow forms need variegated pattern shapes and colors, the invention herein only requires replacement with different pattern shapes and colors, wherein fabricating new hollow form molds is not required, which enables increased production flexibility and, furthermore, reduces cost.

While the present invention has been described in relation to the most practical and preferred embodiments, the disclosed embodiments shall not be construed as a limitation of the invention herein, but are intended to include the broadest interpretations and equivalent arrangements within the spirit and scope of the invention herein.

What is claimed is:

1. A hollow form surface pattern structure comprising a hollow form body having a first-level faceplate and a second-level faceplate, a space formed between the two faceplates and a pattern figured on the first-level faceplate, the pattern being an alphanumeric character, a graphic design or a trademark, an arresting edge extending from the outline of the pattern such that a recessed area is formed in a bottom section of the pattern by the arresting edge, a first section at a lower extent of the arresting edge of the pattern covers and fastens onto the first-level faceplate and a second section is exposed on the surface of the first-level faceplate, the first-level faceplate fits into the recessed area of the pattern itself formed by the arresting edge, and a plurality of indented air escape slots are formed at spaced intervals along a bottom edge of the arresting edge of the pattern.

2. A hollow form surface pattern structure comprising a hollow form body having a first-level faceplate and a second-level faceplate, a space formed between the two faceplates and a pattern figured on the first-level faceplate, the pattern being an alphanumeric character, a graphic design or a trademark, an arresting edge extending from the outline of the pattern such that a recessed area is formed in a bottom section of the pattern by the arresting edge, a first section at a lower extent of the arresting edge of the pattern covers and fastens onto the first-level faceplate and a second section is exposed on the surface of the first-level faceplate, the first-level faceplate fits into the recessed area of the pattern itself formed by the arresting edge, a frame surrounding the pattern, and a plurality of air escape slots are formed at spaced intervals along a lower extent of the frame.

3. The pattern structure of claim 2 wherein the air escape slots along the first section are covered by the first-level faceplate and are not exposed at the visible outer surface area of the first-level faceplate.

4. A hollow form surface pattern structure comprising a hollow form body having a first-level faceplate and a second-level faceplate, a space formed between the two faceplates and a pattern figured on the first-level faceplate, the pattern being an alphanumeric character, a graphic design or a trademark, an arresting edge extending from the outline of the pattern such that a recessed area is formed in a bottom section of the pattern by the arresting edge, a first section at a lower extent of the arresting edge of the pattern covers and fastens onto the first-level faceplate and a second section is exposed on the surface of the first-level faceplate, the first-level faceplate fits into the recessed area of the pattern itself formed by the arresting edge, the pattern includes a plurality of pattern units, and a plurality of indented air escape slots are formed at spaced intervals along a bottom edge of the arresting edge.

5. A hollow form surface pattern structure comprising a hollow form body having a first-level faceplate and a second-level faceplate, a space formed between the two faceplates and a pattern figured on the first-level faceplate, the pattern being an alphanumeric character, a graphic design or a trademark, an arresting edge extending from the outline of the pattern such that a recessed area is formed in a bottom section of the pattern by the arresting edge, a first section at a lower extent of the arresting edge of the pattern covers and fastens onto the first-level faceplate and a second section is exposed on the surface of the first-level faceplate, the first-level faceplate fits into the recessed area of the pattern itself formed by the arresting edge, a plurality of air escape slots are provided along the first section and covered by the first-level faceplate, and the air escape slots are not exposed at the visible outer surface area of the first-level faceplate.

* * * * *